(12) United States Patent
Snell

(10) Patent No.: US 11,643,611 B2
(45) Date of Patent: May 9, 2023

(54) FIRE STARTING STRIP

(71) Applicant: CERTAINLY WOOD LTD, Hereford (GB)

(72) Inventor: Simon George Snell, Hereford (GB)

(73) Assignee: CERTAINLY WOOD LTD, Hereford (GB)

( * ) Notice: Subject to any disclaimer, the term of this patent is extended or adjusted under 35 U.S.C. 154(b) by 0 days.

(21) Appl. No.: 17/242,836

(22) Filed: Apr. 28, 2021

(65) Prior Publication Data

US 2022/0348838 A1    Nov. 3, 2022

(51) Int. Cl.
*C10L 11/06* (2006.01)
*A47J 37/07* (2006.01)
*C10L 11/04* (2006.01)
*F23Q 2/18* (2006.01)

(52) U.S. Cl.
CPC ............. *C10L 11/06* (2013.01); *A47J 37/079* (2013.01); *C10L 11/04* (2013.01); *F23Q 2/18* (2013.01)

(58) Field of Classification Search
CPC .. C10L 11/06; C10L 11/04; C10L 2200/0453; A47J 37/079; F23Q 2/18; Y02E 50/30
See application file for complete search history.

(56) References Cited

U.S. PATENT DOCUMENTS

| | | | |
|---|---|---|---|
| 3,367,758 A * | 2/1968 | Ambrose | A01G 13/06 44/628 |
| 5,958,090 A | 9/1999 | Chandaria | |
| 6,766,908 B2 * | 7/2004 | Chandaria | B65D 85/62 206/782 |
| 2007/0169409 A1 | 7/2007 | Chang | |
| 2010/0107486 A1 * | 5/2010 | Heumuller | C10L 11/06 44/533 |
| 2012/0040583 A1 * | 2/2012 | Heumueller | C10L 11/04 442/413 |
| 2012/0090227 A1 | 4/2012 | Lush | |
| 2017/0081607 A1 | 3/2017 | Schunk | |
| 2019/0127653 A1 | 5/2019 | Brender | |

FOREIGN PATENT DOCUMENTS

| | | | | |
|---|---|---|---|---|
| AT | 503165 A1 * | 8/2007 | | |
| DE | 20209646 U1 | 10/2002 | | |
| DE | 202007003891 U1 * | 11/2007 | | C10L 11/04 |
| DE | 102008061266 A1 * | 5/2010 | | C10L 11/04 |
| DE | 202013000242 U1 * | 4/2013 | | |
| EP | 1375632 B1 * | 10/2005 | | C10L 11/04 |
| EP | 2014746 A2 * | 1/2009 | | C10L 11/04 |
| EP | 2230291 A1 | 9/2010 | | |
| GB | 121431 A | 12/1918 | | |
| GB | 125260 A | 4/1919 | | |
| GB | 2584302 A * | 12/2020 | | C10L 11/04 |
| WO | 2010060412 A1 | 6/2010 | | |
| WO | WO-2019172795 A1 * | 9/2019 | | B65D 5/46008 |

* cited by examiner

*Primary Examiner* — Pamela H Weiss
(74) *Attorney, Agent, or Firm* — Michael E. Dockins; Shumaker, Loop & Kendrick, LLP

(57) ABSTRACT

A fire starting strip 10 for igniting a bed of charcoal or for lighting a log fire, without the need for any one or more of: kindling, lighter fluid or newspaper, the fire starting strip 10 comprising an elongate body 12 which is covered or impregnated with fuel, the elongate body 12 having a length substantially in the range of 15 to 100 cm and being substantially at least five times longer than it is wide.

11 Claims, 1 Drawing Sheet

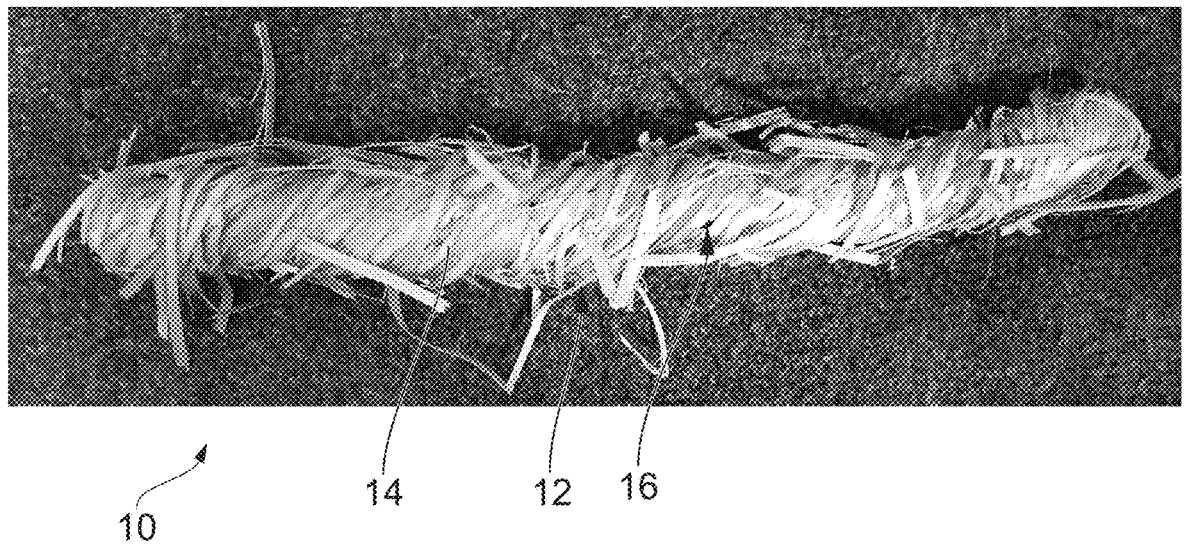

FIRE STARTING STRIP

BACKGROUND

Field

The present invention relates to a fire starting strip for igniting a bed of charcoal or a log fire, without using a secondary ignition fuel (such as lighter fluid) or kindling.

Discussion

Lighting a fire, whether a log or coal fire indoors or on a charcoal barbecue, is often seen by many as quite a challenge. Fire lighting outdoors can particularly be a challenge when confronted with the elements of potential wind and/or rain.

There are a number of different fuels that can be used for fires that need to be ignited. These range from wood logs to biomass heat logs, coal and smokeless fuels used in home open fires or wood burners, to charcoal and briquettes for barbecues. There is also an increasing demand to light log fires in wood-fired pizza ovens and for outdoor camping.

For wood log or coal fires, kindling or newspaper is often used to help ignite the main fuel, but requires some form of additional fuel to assist in igniting the fire. This would either be in the form of a paraffin firelighter, lighter fuel, or sometimes electric firelighters which provide a powerful concentrated heat to ignite the main fuel.

Kindling, in the form of relatively small and thin sticks of wood, is a commonly used smaller fuel. It is used to help light the main fuel (logs or charcoal) by providing the initial heat source, and also helping to warm the chimney or flue, which in turn increases the rate at which air is drawn up the chimney or flue. Most retailers that sell coal or logs also stock kindling alongside, in addition to firelighters.

Whilst kindling provides an excellent solution to help start a fire, it is considerably bulky in volume. This not only takes up space for retailers, but also in the home or next to the fireplace. In terms of wild camping, it is highly impractical to carry kindling sticks to help light a fire.

In terms of lighting charcoal or briquette barbecues, paraffin firelighters or lighter fluid are the most commonly used form of secondary fuel used to ignite the main fuel source. With firelighters, several blocks are normally needed to help light the large bed of charcoal and to get even ignition across the bed. Both these ignition fuels invariably have a strong petroleum odour and are far from a natural product. Charcoal is sometimes sold in small paper packs which can be lit and should light the main fuel source. Another method of lighting charcoal include a charcoal chimney starter, but this still needs a firelighter or lighter fuel to assist with lighting the main fuel source.

Firelighters will nearly always be used to ignite kindling and/or newspaper in a fire. Firelighters are themselves lit by using a match or lighter, or even a fire steel to light campfires. Various different firelighters are commercially available. For example, Zip produces a range of firelighters in the form of frangible cubes containing kerosene. Other firelighters containing only natural or eco-friendly materials are also available in various forms.

Typically, next to a fireplace or wood-burning stove, there will be a stock of firewood, kindling and firelighters, and perhaps even newspaper.—Thus, all of the ingredients to make a fire are provided, each with their own storage receptacle such as log basket and/or kindling bucket.

The action of lighting a log fire requires the correct method of using the 'ingredients' of firelighters, possibly newspaper, kindling and logs. The 'laying' of a fire is somewhat of an art form, with the requirement to allow adequate airflow through the fuel to aid ignition, and also to create a warming of the flue or chimney to aid draft and intensify the flames and heat generated.

The lighting of a charcoal barbecue also needs strategic placing of several firelighters within the bed of charcoal, and the same important considerations regarding airflow still apply, as mentioned above.

Once ready, the firelighters are quickly lit one by one. Sometimes newspaper or other material is used too, but this quickly burns through and invariably does not provide sufficient heat for a long enough time to light the main fuel source. Also, modern day newspapers and magazines contain inks which may be harmful if burnt. If the positions of the various firelighters are suitable, then the logs or charcoal should eventually catch fire (weather conditions permitting, if outdoors). Even so, it takes time for the burning regions to become fully established and link up, and it takes even more time until the fire reaches an even temperature across the bed of charcoal. This can present an unwelcome delay when barbecuing, because it takes time for there to be sufficient heat for cooking.

Even though fire lighting with kindling is recommended, it is possible to try and use firelighters on their own to light logs directly. In many cases, however, firelighters cannot provide sustained heat at a high enough temperature for a long enough time to ignite the main fuel source. Even if a large number of firelighters are used, it is frequently the case that the firelighters fail to light logs or charcoal at the first (or second) attempt, particularly for damp logs or charcoal. In any case, it still takes a long time for the fire to reach an even temperature.

It is possible to douse charcoal with an accelerant such as lighter fuel (or similar) to temporarily provide extra fuel to encourage ignition. However, this is not the safest or most environmentally-friendly way to light a barbecue.

It is an object of the present invention to reduce or substantially obviate the aforementioned problems. It is also an aim of the invention to make fire lighting a much simpler, easier, and more environmentally-friendly process.

SUMMARY

According to a first aspect of the present invention, there is provided a fire starting strip for igniting a bed of charcoal or for lighting a log fire or firewood, without the need for any one or more of: kindling, lighter fluid or newspaper, the fire starting strip comprising an elongate body which is covered or impregnated with fuel, the elongate body having a length substantially in the range of 15 to 100 cm and being substantially at least five times longer than it is wide.

The length of the firestarter is important to the present invention. The firestarting strip effectively amalgamates a firelighter with a fuel source into one product as a firestarter which can burn intensely enough to, on its own, light charcoal or logs. Neither separate kindling nor accelerant is necessary.

The fire starting strip may be considered to be a fire starting rope (or strip of rope). It allows a log fire (e.g. in a wood-burning stove) or charcoal fire (e.g. in a barbecue) to be started easily without needing to use any kindling or fire lighting fluid. The strip simply needs to be lit with a match at one or both ends and it quickly lights along its entire length. This avoids the issues of where and how to store kindling, and indeed the need to buy it at all, which brings down the average cost of lighting a fire.

Surprisingly, the fire starting strip or rope burns for a long time and provides an intense heat across a large area of the log fire or bed of charcoal. This makes lighting a fire easier and quicker, because it is considerably simpler to light the main fuel source. This of course assumes that the main fuel source is sufficiently dry and of the right quality for a successful fire.

By using a fire starting strip or rope according to the invention, there is no need to consider relative positions of different firelighters or kindling in the fire. This is because only one single firestarting strip or firestarting rope is required for successful ignition of the main fuel source. This applies to both log fires and charcoal fires. The heat required is quickly generated once the strip is alight, subject to sufficient airflow around the main fuel source and strip or rope.

The elongate body may include an absorbent or porous material for containing the fuel. That is, it should be absorbent or porous enough for the body to absorb or be impregnated with the fuel. This can also allow the body to retain the fuel.

The strands (or slivers or shavings) are made of wood wool. Wood wool may also be known as 'excelsior' in some countries. Most or substantially all of the strands are twisted together in the same direction. There may be air gaps between the strands.

Wood wool typically includes thin wood shavings or fibres, which may on the order of about 1 to 3 mm thick. Typically, wood wool is made of pine or spruce or similar softwoods. However, any suitable wood source may be used. Individual strands of wood wool can be up to several tens of centimetres long. This is long enough for the strands to be formed into a long rope, which can then be cut up into shorter strips or lengths of rope.

The strands may be tightly twisted or woven together in an inner region or core of the strip or rope. The stands may be less tightly twisted or woven together in an outer region of the strip or rope. That is, the region around the core.

The elongate body may include one or more air gaps. For example, one or more pockets may be provided in the body. The air gap(s) may be provided between strands, if strands are provided.

Fuel may be added before or after the rope is cut to provide a firelighting strip, but preferably fuel is added to the rope prior to cutting. Alternatively, strands can be twisted together into a line or strip which is already of suitable length, or which can be trimmed to size. Similarly, this may happen before or after fuel is added to the strip.

The elongate body may be considered to be a fuel carrier. In that sense, it will be appreciated that the elongate body and the fuel are separate components. The elongate body acts as a carrier for the fuel. The elongate body may itself be combustible and act as a second fuel source, but it is distinct from the fuel covering or impregnating the body.

The fuel may be in and on the strands. Where the strands are combustible, the strands can be considered as both a carrier for fuel (such as a wax) as well as a fuel in their own right (for example, if made of wood).

The fuel may be a solid fuel, such as a wax. Preferably, the fuel is a paraffin wax or hydrocarbon wax. In some embodiments, the wax is melted to liquid form for impregnating the rope. After the strip or rope has been treated with wax, it is then left to cool. This provides a more rigid length of rope than the wax-less equivalent, but there is still an element of flexibility.

More preferably, the fuel is refined paraffin wax. For example, Sasolwax 6202 (CAS number: 8002-74-2) may be used.

Refined paraffin wax may be considered to have a low percentage of oil in the wax. Ideally there are few impurities too. For example, there may be 1.5% or less oil in the wax. There may be 1% or less oil in the wax. There may be 0.5% or less oil in the wax.

The elongate body may include first and second opposing ends. The length of the fire starting lighting strip can be considered to be the distance between the first and second ends when measured along the body.

The strip is three-dimensional. The strip may be at least about 1.5 cm or 2 cm in width. The strip may be at least about 1.5 cm or 2 cm in depth. The width or diameter of the body may be substantially in the range 2 cm to 3 cm. The width of the body may be approximately constant between the ends or may vary in diameter substantially within the limits of the range. Having uniform or near uniform width helps to generate heat evenly along the strip or rope once ignited.

The elongate body may be about, or at least about, 10 cm or 11 cm long. The elongate body may be at least about, or at least about, 12 cm or 13 cm long. The elongate body may be at least about, or at least about, 14 or 15 cm long. The elongate body may be about, or at least about, 17 cm or 18 cm or 20 cm long. The elongate body may be up to about 75 cm long. The elongate body may be up to about 50 cm long.

The elongate body may have a length substantially in the range 15 cm to 40 cm.

The elongate body may have a length of about 25 cm. This length is preferred for storage and portability, as well as providing a size that will lie flat along most or all of the length of a standard log, or cover a significant area for a bed of charcoal. Longer lengths may be suitable for larger barbecues or fireplaces.

The fire starting strip or rope may be substantially flexible. For example, the elongate body may be flexed such that it is non-linear, without snapping. That is, ends of the elongate body may be moved relative to each other, or put another way the opposing end regions of the body may not share a common linear axis when the body is flexed.

The strip or rope may be flexible enough for the ends of the strip or rope to face in substantially the same direction, if suitable force is applied to flex or bend the strip. The strip or rope may be flexible enough the ends of the strip can be brought into contact with each other. Again this may done without snapping the strip or rope.

Providing a flexible firestarter allows it to be bent and re-shaped into a coiled or coil-like shape. This is particularly useful when lighting a log fire as it provides a slight pyramid shape onto which firewood logs can be stacked ready for lighting and this helps maximise airflow.

The length and diameter of the strip affects the extent to which it can be coiled. Depending on the flexibility of the strip or length of rope, it may be necessary to permanently deform it so that it retains a coiled shape, or for a log or charcoal briquettes to be placed on top of it to hold it in a coiled configuration, for example.

In some embodiments, the elongate body may be substantially rigid. Air gaps or pockets may still be provided in the body. The body may have a rod-like shape.

Although not explicitly recited, any lower length limit mentioned in this specification can be combined with any upper length limit mentioned in this specification to provide a range of lengths for the firestarting strip.

The elongate body may be substantially at least 5 or 7.5 times longer than it is wide. Put another way, the length to width ratio of the elongate body may be at least 5:1 or 7.5:1. The elongate body may be up to 20 times longer than its width.

The elongate body may be substantially up to 40 times, or 30 times, or 20 times, longer than it is wide. Preferably, the elongate body may be about 8 to 13 times as long as it is wide. This particularly applies where the elongate body is about 25 cm long and about 2 to 3 cm wide.

The length to width ratio may be considered to be a length to average (or mean) width ratio. This accounts for variations in the width of the elongate body which may affect the length to width ratio at selected sections of the elongate body.

According to a second aspect of the invention, there is provided a fire starting rope, for igniting a bed of charcoal in a barbecue or for lighting a log fire without the need for any one or more of: kindling, lighter fluid or newspaper, the fire starting rope comprising strands of wood wool which are twisted and/or woven together to form an elongate body or length of rope which is impregnated with a fuel such as paraffin wax, has a length substantially in the range of 15 to 100 cm and is substantially at least five times longer than it is wide.

The fire starting rope may include any feature or features presented with respect to the first aspect of the invention.

A pack comprising one or more fire starting strips, or one or more fire starting ropes, may be provided.

The fire starting strips or ropes may be packed together such that each strip or rope is arranged substantially along a respective longitudinal axis. That is, each strip/rope may be laid out substantially straight in a pack (e.g. box or container), optionally with the strip/rope extending from one end of the pack to the other end of the pack.

A given axis (of a give strip or ripe) may be arranged to be substantially parallel to the axis of another strip or rope. A given axis may be arranged to be substantially parallel to some or all of the other axes (where there is a plurality of strips/ropes).

This optimises packing efficiency within the space in the pack. Having the strips or rope sections arranged to be parallel to each other also minimises fragmentation of the wood wool in the strip/rope prior to use.

According to a third aspect of the present invention, there is provided a method of manufacturing one or more fire starting strips or fire starting ropes for igniting a bed of logs or charcoal without any one or more of kindling, lighter fluid or newspaper, the method comprising the steps of:
  a) providing a rope formed of strands which are twisted and/or woven together, the strands being covered or impregnated with a fuel; and
  b) cutting the rope to generate one or more elongate bodies, each elongate body having a length substantially in the range of 15 to 100 cm and being substantially at least five times longer than it is wide.

The method may include any feature or features presented with respect to the first aspect of the invention. The rope in step (a) may be of any suitable length. The rope in step (a) may already be impregnated with fuel, or the elongate body or bodies may be impregnated with fuel after step (b). The rope or strands may be dipped in fuel, such as (refined) paraffin wax, and allowed to dry before commencing step (b).

BRIEF DESCRIPTION OF THE DRAWINGS

For a better understanding of the present invention, and to show more clearly how it may be carried into effect, reference will now be made by way of example only to the accompanying drawings, in which:

FIG. 1 shows a plan view of a fire-starting strip according to the present invention.

DETAILED DESCRIPTION OF THE EMBODIMENTS

Referring to FIG. 1, a fire starting strip is indicated generally at 10. In this embodiment, the strip 10 is a portion of rope. The strip 10 in FIG. 1 is shown in its standard length (or linear) format. However, if suitably long, the strip 10 can also be arranged as a coil.

The strip 10 is made of wood wool. The wood wool is provided in the shape of an elongate body, indicated generally at 12. The strip 10 may in some embodiments be referred to as a stick, a rod, or a baton. These terms are considered to be applicable to any embodiment of the invention.

The body 12 is approximately cylindrical. The body 12 is approximately 25 cm long in this embodiment. The width of the body 12 is about 2.5 cm in diameter along its length, give or take up to 0.5 cm. This means that strip 10 is about ten times longer than it is wide.

Strands 14 of wood wool are twisted or woven together to form the body 12. The strands 14 are combustible because they are made of wood. However, they are more combustible than wood wool alone because it includes a refined paraffin wax.

Although there are some loose or splayed strands, most of the strands 14 remain wrapped together. The strands 14 are twisted together relatively tightly so that they maintain their shape. However, there are small air gaps between the strands 14. An example of such a gap is indicated at 16. This is particularly true for an outer region of the strip 10, but air gaps may still be present in an inner region of the strip 10. The outer region may be less tightly twisted together than the inner region.

The wood wool strands 14 includes refined paraffin wax as a fuel for improving combustion. The refined paraffin wax impregnates or coats the strands 14. The wax can help to bind the strands 14 together. The wax also mitigates against water ingress.

The wax may only impregnate or coat outer strands 14 of the strip 10. The extent to which inner strands (not visible) of the strip 10 are impregnated or coated with refined paraffin wax depends on how the wax is applied, and on how tightly the strands are twisted together (and the size of gaps between the strands 14).

Due to its length, the strip 10 is flexible, or at least flexible for a firelighter. One end or end face of the strip 10 can be moved relative to the other end or end face. In other embodiments, the strip 10 is substantially rigid.

The degree of flexibility is affected to some extent by how tightly the strands 14 are wrapped together, and how brittle the strands 14 are. Less tightly wrapped strands and/or less brittle strands will allow greater flexibility. Similarly, a longer strip 10 is more flexible than a shorter strip of the same width/diameter.

To make the strip 10, the first step is to produce (or acquire) a rope of wood wool. The rope is normally on the order of tens of metres long, but any suitable length may be used.

Refined paraffin wax is then added to the rope strands. In this embodiment, the rope is dipped in hot, liquid refined paraffin wax for a period of time. This allows the wax to impregnate and/or adhere to the strands. The rope is then withdrawn from the source of paraffin wax and allowed to cool and dry. In other words, the liquid paraffin wax is allowed to solidify or set.

The rope can subsequently be cut into a series of fire starting strips or lengths of rope. In this embodiment, the rope is cut into strips of about 25 cm in length. Of course, the rope may instead be cut into shorter strips, longer strips, or strips of a variety of lengths in other embodiments, within the scope of the claims.

To use the fire starting strip (or rope) 10 for lighting a charcoal barbecue, a single strip 10 is laid on a grill or grate (not shown) and charcoal added over the top.

For log fire lighting, the strip can (if suitably long) be provided in a semi-coiled arrangement and laid on the grate with two or three (or more) smaller logs added across the strip. Alternatively, two (or more) small logs can be laid across the grate and the single length laid between the logs.

In each case, suitable air gaps should be left between the logs or briquettes. This is done so that the strip is not smothered whilst burning. The strip 10 is positioned centrally relative to the logs or charcoal around it. Ideally, there should be means to allow air to circulate under the strip 10 to help it burn.

The strip 10 can then be ignited at one or more places by using a match or lighter. Of course, another suitable ignition source or source of fire can be used instead, if needed. The burning match(es) can be extended through one of the gaps and/or touched to an end of the strip 10 (if exposed). If the strip is lit at several points along its length at the start, this can help the logs or charcoal to catch fire at about the same time and so the fire reaches an even temperature across the grill more quickly.

It will be appreciated that a substantially similar series of steps can be used for starting a log fire in a wood-burning stove, for example.

The embodiments described above are provided by way of example only, and various changes and modifications will be apparent to persons skilled in the art without departing from the scope of the present invention as defined by the appended claims.

What is claimed is:

1. A method of manufacturing a fire starting rope for igniting a bed of logs or charcoal when laid or arranged underneath the same without any one or more of:
    kindling, lighter fluid, accelerant or newspaper, the method comprising the steps of:
    a) forming a fire starting rope by winding a plurality of individual strands of wood wool into a rope spiral, the plurality of individual strands being twisted or woven together to a first degree of tightness in an inner region or core of the fire starting rope, and the plurality of individual strands being twisted or woven together to a second degree of tightness in an outer region of the fire starting rope, wherein the outer region is disposed around the inner region or core of the rope, and the second degree of tightness is less tight than the first degree of tightness, wherein air gaps are present between the individual strands, and wherein the air gaps present between the individual strands within the outer region are relatively larger than the air gaps present between the individual strands within the inner region;
    b) impregnating each of the plurality of the individual strands with a fuel by dipping the fire starting rope into a liquid fuel for a period of time to allow a portion of the liquid fuel to impregnate the fire starting rope, and then withdrawing the fire starting rope from the liquid fuel, the portion of the liquid fuel impregnated in the fire starting rope thereafter solidifying or setting as the fuel impregnated in each of the plurality of the individual strands; and
    c) cutting the fire starting rope to generate one or more elongate bodies, each elongate body having a length in the range of 15 to 100 cm and being at least five times longer than it is wide.

2. The fire starting rope method of claim 1, in which each elongate body is at least 7.5 times longer than the corresponding elongate body is wide.

3. The method of claim 1, wherein the liquid fuel in step b) is hot liquid fuel, a portion of the hot liquid fuel impregnates the fire starting rope dipped therein, and withdrawing the fire starting rope from the hot liquid fuel allows the portion of hot liquid fuel impregnated in the fire starting rope to cool and thereby solidify or set.

4. The method of claim 1, wherein step b) includes impregnating the plurality of individual strands in both the outer region and the inner region or core with the fuel.

5. The method of claim 1, wherein each elongate body is rigid.

6. The method of claim 1, in which the fuel includes a wax.

7. The method of claim 1, in which the fuel includes paraffin wax or refined paraffin wax.

8. The method of claim 1, in which the length of each elongate body is in the range 15 cm to 75 cm.

9. The method of claim 1, in which the length of each elongate body is in the range 15 cm to 50 cm.

10. The method of claim 1, in which the length of each elongate body is in the range 15 cm to 40 cm.

11. The method of claim 1, in which the length of each elongate body is in the range 15 cm to 25 cm.

* * * * *